(12) United States Patent
Perez et al.

(10) Patent No.: US 12,092,201 B2
(45) Date of Patent: Sep. 17, 2024

(54) GEROTOR PUMP AS FOR A TRANSMISSION

(71) Applicant: Deere & Company, Moline, IL (US)

(72) Inventors: Javier Jose Perez, Madrid (ES); Daniel Vergara Martinez, Madrid (ES)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/317,993

(22) Filed: May 16, 2023

(65) Prior Publication Data
US 2023/0392683 A1 Dec. 7, 2023

(30) Foreign Application Priority Data

Jun. 1, 2022 (DE) .......................... 102022113791.0

(51) Int. Cl.
*F16H 57/04* (2010.01)
*F04C 2/10* (2006.01)

(52) U.S. Cl.
CPC ........... *F16H 57/0436* (2013.01); *F04C 2/10* (2013.01); *F04C 2/102* (2013.01); *F16H 57/0408* (2013.01); *F16H 57/0412* (2013.01); *F04C 2210/20* (2013.01); *F04C 2210/206* (2013.01); *F04C 2240/30* (2013.01); *F04C 2240/60* (2013.01)

(58) Field of Classification Search
CPC ............. F16H 57/0436; F16H 57/0408; F16H 57/0412; F04C 2/10; F04C 2/102; F04C 2210/20; F04C 2210/206; F04C 2240/30; F04C 2240/60
See application file for complete search history.

(56) References Cited

U.S. PATENT DOCUMENTS

| | | | | |
|---|---|---|---|---|
| 1,773,211 | A | * 8/1930 | Wilsey | ..................... F04C 2/101 418/16 |
| 4,519,755 | A | * 5/1985 | Hanson | .................... F04C 29/12 418/9 |
| 6,386,836 | B1 | * 5/2002 | Johnson | ................ F04C 11/001 417/310 |

(Continued)

FOREIGN PATENT DOCUMENTS

| | | |
|---|---|---|
| CN | 2617956 Y | 5/2004 |
| CN | 201714742 U | 1/2011 |

(Continued)

OTHER PUBLICATIONS

Extended European Search Report and Written Opinion issued in European Patent Application No. 23174522.5, dated Oct. 20, 2023, in 06 pages.

*Primary Examiner* — Dominick L Plakkoottam
*Assistant Examiner* — Paul W Thiede (57) ABSTRACT

A gerotor pump arrangement for extracting hydraulic fluid from a transmission housing of a transmission. A first gerotor set has a first inner rotor and a first outer rotor, and a second gerotor set has a second inner rotor and a second outer rotor. The first gerotor set forms a hydraulically drivable drive side of the gerotor pump arrangement, and the second gerotor set forms a pump side, driven by the first gerotor set, wherein the first and second inner rotors are rotationally fixedly mounted on a common shaft which is rotatable about a rotational axis. A transmission with such a gerotor pump arrangement is also disclosed.

20 Claims, 7 Drawing Sheets

(56) References Cited

U.S. PATENT DOCUMENTS

| | | | | |
|---|---|---|---|---|
| 6,612,822 B2* | 9/2003 | Buschur | ............. | F04C 15/0049 |
| | | | | 418/21 |
| 2017/0321794 A1* | 11/2017 | Kiehlneker | ......... | F04C 15/0015 |
| 2019/0249661 A1* | 8/2019 | Wang | .................... | F04C 11/008 |
| 2021/0025331 A1 | 1/2021 | Yates et al. | | |

FOREIGN PATENT DOCUMENTS

| | | | | |
|---|---|---|---|---|
| CN | 211449019 U | 9/2020 | | |
| CN | 113250951 A | 8/2021 | | |
| DE | 102016121237 A1 | 5/2018 | | |
| DE | 102019120238 A1 | 1/2021 | | |
| WO | WO-2012174651 A1 * | 12/2012 | ............. | F01C 1/086 |

* cited by examiner

GEROTOR PUMP AS FOR A TRANSMISSION

RELATED APPLICATION

This application claims priority to DE 10 2022 113 791.0 which is hereby incorporated by reference in its entirety.

FIELD OF THE DISCLOSURE

The invention concerns gerotor pump arrangements, such as for extracting hydraulic fluid from a transmission housing of a transmission.

BACKGROUND OF THE DISCLOSURE

The invention concerns a gerotor pump arrangement for extracting hydraulic fluid from a transmission housing of a transmission, with a first gerotor set and a second gerotor set, wherein the first gerotor set comprises a first inner rotor and a first outer rotor, and the second gerotor set comprises a second inner rotor and a second outer rotor.

Gerotor pump arrangements are well known and commonly used. They usually contain, as a displacement means, an inner rotor configured as a gear wheel with external toothing, and an outer rotor configured as a gear wheel (ring gear) with internal toothing, wherein the tooth count of the inner rotor is lower than that of the outer rotor, and the inner rotor rotates inside the outer rotor. The gear wheels rotate about center lines offset to one another, and the teeth on one side intermesh with one another while on the other side the tooth heads slide past one another. The working fluid is displaced by the penetration of the teeth of the one rotor into the tooth gaps of the other rotor.

A gerotor pump arrangement is disclosed for example in DE 102016121237 A1 and comprises a pump housing, in which a shaft is rotatably mounted and in which a gerotor, an inlet and an outlet are received, with a stationary gerotor outer element which is bounded axially by two chamber walls and in which a pressure valve is assigned to each chamber-forming foot portion of the internal toothing. The gerotor pump arrangement furthermore comprises a gerotor inner element with an external toothing in chamber engagement, and at least one inlet chamber, wherein an eccentric portion of the shaft on which the gerotor inner element is guided in circulation and mounted rotatably, is configured as an eccentric protrusion at a free end of the shaft.

Such pump arrangements configured as gerotor pumps are used for example in transmissions to provide a hydraulic circuit for cooling and/or lubricating the transmission. The gerotor pump may for example be driven via a drive gear wheel branching off in the transmission itself, wherein the drive gear wheel is connected to the gerotor of the gerotor pump and the gerotor pump conveys the transmission oil from the transmission housing to an oil reservoir. From there, it is conveyed via a further pump system at another point to the transmission housing so that a hydraulic circuit is created. The gerotor drive via a drive gear wheel may lead to a disadvantageously large installation space for the gerotor pump arrangement and hence for the entire transmission housing. This gerotor pump arrangement can only be driven in conjunction with the drive gear wheel concerned, and the gerotor arrangement is without drive in a transmission switching state in which the drive gear wheel is at idle, such as for example in reversing mode or in another gear position, and the hydraulic circuit for lubrication/cooling is interrupted. This gerotor pump arrangement cannot be operated independently of the gear of the transmission, nor independently of the drive wheel.

SUMMARY OF THE DISCLOSURE

The gerotor pump arrangement of the present disclosure provides a first gerotor set which forms a hydraulically drivable drive side of the gerotor pump arrangement, and a second gerotor set forms a pump side, driven by the first gerotor set, of the gerotor pump arrangement, wherein the first and second inner rotors can be rotationally fixedly mounted on a common shaft which is rotatable about a rotational axis. The hydraulically drivable drive side of the gerotor pump arrangement can provide a drive of the gerotor pump arrangement of a transmission in which the gerotor pump arrangement is used, which can be operated independently of the gear of the transmission and also requires a smaller installation space. Thus, the hydraulic supply provided by the gerotor pump arrangement can be installed compactly and also ensured in reversing operation, or independently of a gear of the transmission, without interruption.

The gerotor pump arrangement may be equipped with a first cylindrical housing part and a second cylindrical housing part, wherein the first and second housing parts can each comprise an end housing wall, a circumferential housing wall and a housing opening opposite the end housing wall and covered by a housing cover. The second housing part may fit into the first housing part, whereby a first and a second cylindrical cavity are formed. Such a design of the housing parts allows for a particularly compact and space-saving installation.

The first cylindrical cavity can be defined circumferentially by the circumferential housing wall of the first housing part and at the ends by the end housing wall of the first housing part and the end housing wall of the second housing part. The second cylindrical cavity can be defined circumferentially by the circumferential housing wall of the second housing part and at the ends by the end housing wall of the second housing part and the housing cover covering the housing opening. The housing cover can be dimensioned such that it protrudes beyond the housing opening of the second housing part and also covers the housing opening of the first housing part. Thus, both housing parts may be covered or closed by the same housing cover. This advantageously limits a multiplicity of parts.

The first gerotor set may be mounted in the first cylindrical cavity, and the second gerotor set mounted in the second cylindrical cavity, wherein the shaft extends through the end housing wall of the second housing part and may be rotatably mounted therein. The shaft can be mounted in the end housing wall preferably via a plain bearing bushing, wherein other bearing types, in particular roller bearings, may also be used. The respective inner rotors of the two gerotor sets can be each rotationally fixedly mounted on an end of the shaft. This may for example be achieved with simple pins or bolts which extend through the inner rotors and the shaft. A rotationally fixed connection by means of a toothing or tongue-groove connection is also conceivable. A rotationally fixed connection can exist between the inner rotor of the first gerotor set and the inner rotor of the second gerotor set, so that a rotation of the first inner rotor causes a rotation of the second inner rotor in the same direction.

Starting from the outside of the first housing part, a supply passage can be formed which leads through the circumferential housing wall of the first housing part and through the end housing wall of the second housing part into the second cylindrical cavity. Thus, a through-flow channel can be created which leads from the outside of the first housing part into the second cavity, and in particular into a rolling region of the second gerotor set. Thus, via the supply passage, a liquid medium, for example hydraulic fluid, cooling fluid or lubricating oil, can pass, in particular can be drawn, from a region outside the first housing part into the rolling region of the second gerotor set.

A supply passage and an outlet passage can be formed in the end housing wall of the first housing part and lead into the first cylindrical cavity or into a rolling region of the first gerotor set. Hydraulic fluid may be conveyed into the rolling region via the supply passage. The hydraulic fluid may be discharged from the rolling region via the outlet passage.

A further outlet passage may be provided on the housing cover and can lead into the second cylindrical cavity and in particular into the rolling region of the second gerotor set. Liquid medium which has been drawn into the rolling region of the second gerotor set may be discharged through the outlet passage.

The first and second cylindrical cavities can be coaxial to one another and eccentric to the rotational axis, wherein the two cavities can be identical in dimensions and have the same eccentricity relative to the rotational axis of the shaft. The distance of the centre points of the cylindrical cavities from the rotational axis can be the same for both cylindrical cavities, and the centre points of the cylindrical cavities can lie on a common axis. Accordingly, the outer rotors of the two gerotor sets received in the cylindrical cavities can rotate eccentrically to the inner rotors and to the rotational axis of the common shaft of the inner rotors, wherein the outer rotors can rotate about their own common rotational axis.

A gerotor pump arrangement of the above-described type may be used in a transmission in order to guarantee a circulation of for example hydraulic fluid. The transmission may be connected to a hydraulic device which provides hydraulic fluid for lubrication and/or cooling. Via said gerotor pump arrangement, hydraulic fluid may be extracted from the transmission housing and for example supplied to a hydraulic tank and/or a cooling system, from where the hydraulic fluid is supplied back to the transmission housing. The first gerotor set can be hydraulically driven, wherein hydraulic fluid can be conveyed through the supply passage of the first gerotor set under high pressure into the rolling region of the first gerotor set, and the inner and outer rotors of the first gerotor set can be brought into rotation. The driving hydraulic fluid may be discharged at low pressure via the outlet passage of the first gerotor set. The rotation of the inner rotor of the first gerotor set can also cause the rotation of the inner and outer rotors of the second gerotor set, whereby a suction effect is generated in the rolling region of the second gerotor set and hydraulic fluid can be drawn from the transmission housing via the supply passage of the second gerotor set into the rolling region of the second gerotor set, and can be discharged via the outlet passage of the second gerotor set to the cooling system.

Other features and aspects will become apparent by consideration of the detailed description and accompanying drawings.

DETAILED DESCRIPTION OF THE DRAWINGS

Figure 1:
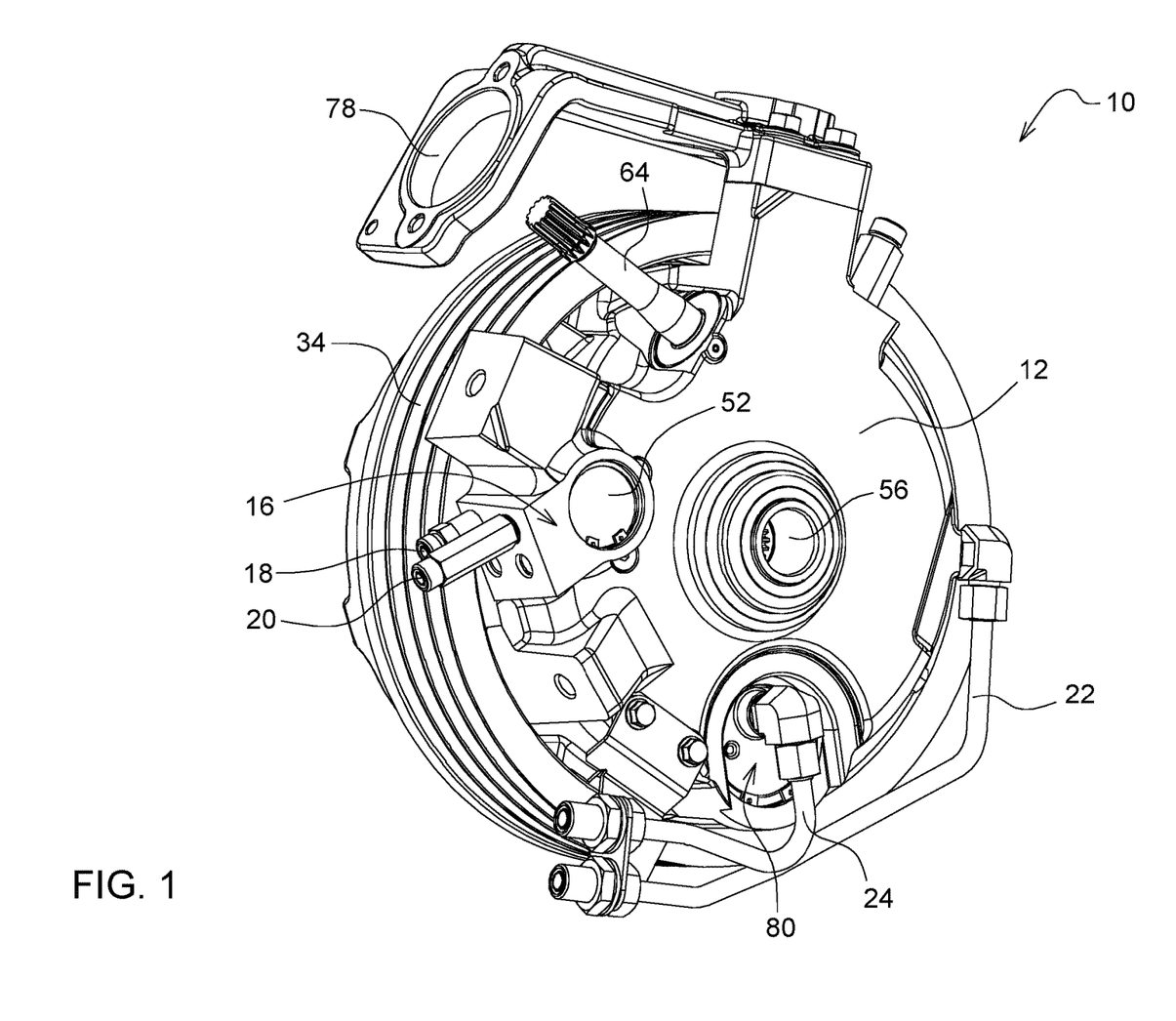
FIG. 1 shows a perspective outer view of a transmission according to the present disclosure.

FIG. 1 shows a transmission 10 of a belt drive (not shown) as may be used on a self-propelled agricultural machine (not shown) for driving conveying, processing or harvesting devices.

Figure 2:
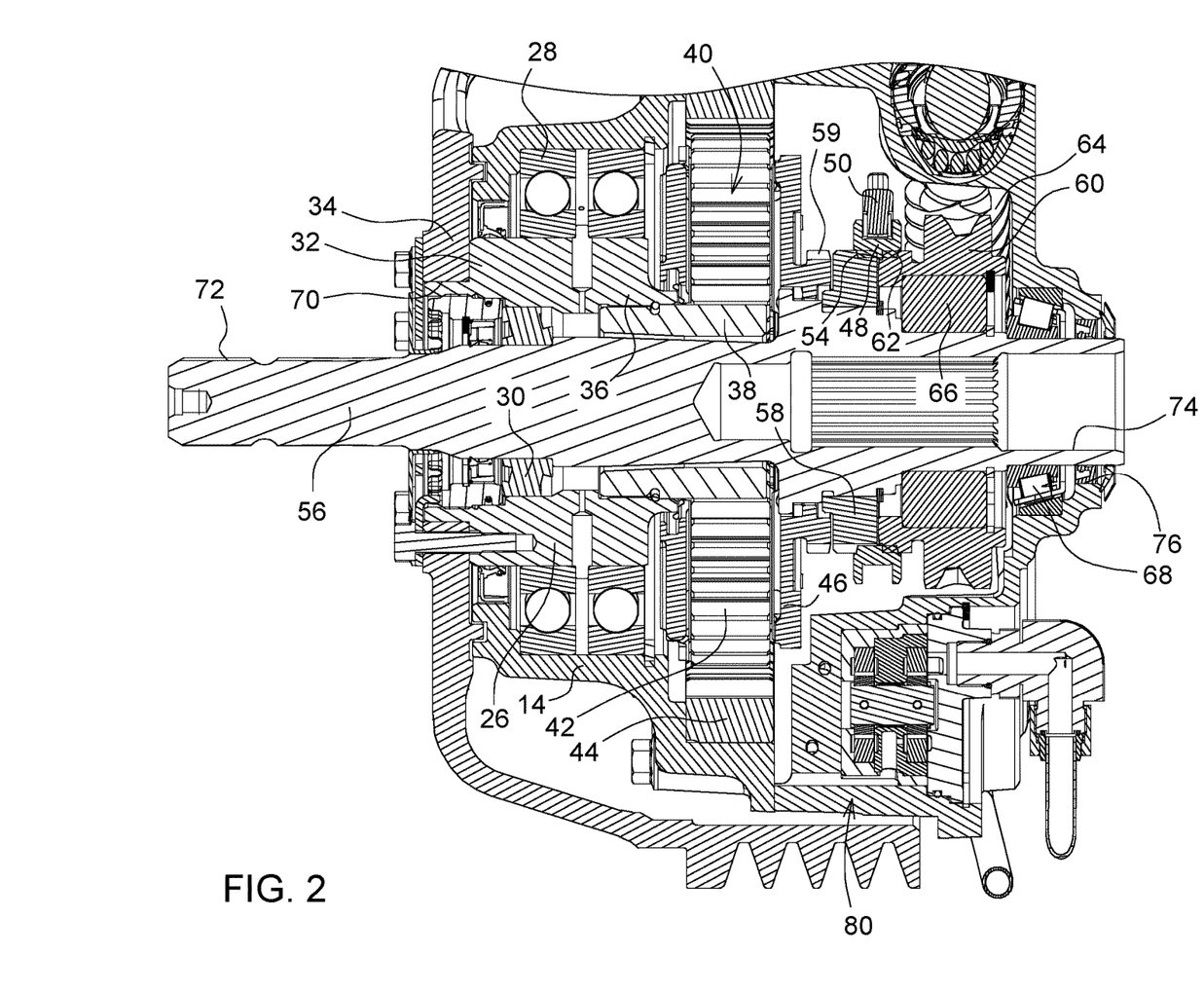
FIG. 2 shows an enlarged, cross-sectional view of the transmission of FIG. 1 with an integrated gerotor pump arrangement.

The transmission 10 can include a first housing part 12 and a second housing part 14 (see FIG. 2). A hydraulic switching device 16 with hydraulic connections 18 and 20 can be provided on the first housing part 12. A hydraulic inflow line 22 and a hydraulic outflow line 24 can be also arranged on the first housing part 12. The inflow and outflow lines 22, 24 can be part of a hydraulic lubricant and coolant circuit for the transmission 10.

FIG. 2 shows a cross-sectional view of the transmission 10 in which further components of the transmission 10 are shown in detail. Accordingly, the second housing part 14 can be connected to the first housing part 12. A cylindrical rotation body 26 can be arranged in the second housing part 14 and mounted in the second housing part 14 by means of a roller bearing 28 arranged on its outside. A further roller bearing 30 can be arranged on the inside of the rotation body 26. The rotation body 26 can furthermore be bolted at its first end 32 to a belt drum 34 and thereby rotationally fixedly connected to the belt drum 34. A sun wheel 38 of a planetary gear mechanism 40 can be rotationally fixedly connected to the rotation body 26 at a second end 36 of the rotation body 26. The sun wheel 38 can stand in engagement with a planet set 42 of the planetary gear mechanism 40. The planet set 42 can roll with a ring gear 44 embedded in the second housing part 14. The planet set 42 may furthermore be mounted on a planet carrier 46 which can be brought into engagement with a shift collar 48 of the switching device 16. The switching device 16 can furthermore comprise a shift fork 50 which may engage in the shift collar 48 and be connected to a hydraulic actuator 52 arranged in the first housing part 12.

The shift collar 48 may have an internal toothing 54 and be mounted thereby on a gear wheel 58, itself rotationally fixedly connected to a drive shaft 56, so as to be axially displaceable relative to the drive shaft 56 and on the gear wheel 58. In a first gear position, the shift collar 48 can be in engagement in one half with an external toothing 59 formed on the planet carrier 46, and in the other half with the gear wheel 58. By axially sliding the shift collar 48, this can be released from engagement with the external toothing 59 of the planet carrier 46 and brought into a second gear position. In the second gear position, the shift collar 48 can be in engagement in one half with an external toothing 62 formed on a worm gear wheel 60, and in the other half with the gear wheel 58. FIG. 2 shows the transmission 10 in the second gear position. The worm gear wheel 60 can stand in drive connection with a worm shaft 64 and be mounted on the drive shaft 56 via a further roller bearing 66. The worm drive comprising the worm gear wheel 60 and the worm gear shaft 64 can create a reversing device, via which the drive shaft 56 can be moved in a rotational direction opposite the drive direction generated via the planetary gear mechanism 40.

The drive shaft 56 can furthermore be mounted on the first housing part 12 via a further roller bearing 66. Thus, the drive shaft 56 can be mounted rotatably at one end on the first housing part 12 by the roller bearing 68, and at the other end in the rotation body 26 via the roller bearing 30 arranged in the interior of the rotation body 26. The drive shaft 56 can extend in length through the first and second housing parts 12, 14 and through a central outlet opening 70 of the belt drum 34. The drive shaft 56 can have a first connection 72 on the side of the outlet opening 70 of the belt drum 34, and a second connection 74 on a central outlet opening 76 of the first housing part 12, wherein the first connection 72 is provided for connection to a first device to be driven (not shown) of the agricultural machine, and the second connection 74 for connection to a second device to be driven (not shown) of the agricultural machine.

As FIG. 2 shows, the belt drive drum 34 can be formed bulging such that it completely surrounds the second housing part 14 and at least partially surrounds the first housing part 12. This allows a compact construction of the transmission 10.

For reversing mode of the transmission, the worm gear shaft 64 can be driven via an electric motor (not shown) which can be mounted via a bracket 78 arranged on the first housing part 12.

In the first gear position, the drive can flow from the belt drive drum 34, via the sun wheel 38 and via the planet set 42 rolling in the ring gear 44, onto the planet carrier 46, and from there via the external toothing 59 of the planet carrier 46 to the shift collar 48 and onto the gear wheel 58 of the drive shaft 56. In the second gear position, the drive may flow from the worm gear shaft, via the worm gear wheel 60, and from there via the external toothing 62 of the worm gear wheel 60 to the shift collar 48 and onto the gear wheel 58 of the drive shaft 56. The rotation direction of the drive shaft 56 in the first gear position can be opposite to the rotation direction of the drive shaft 56 in the second gear position, in which the transmission 10 is operated in reversing mode.

Figure 3:
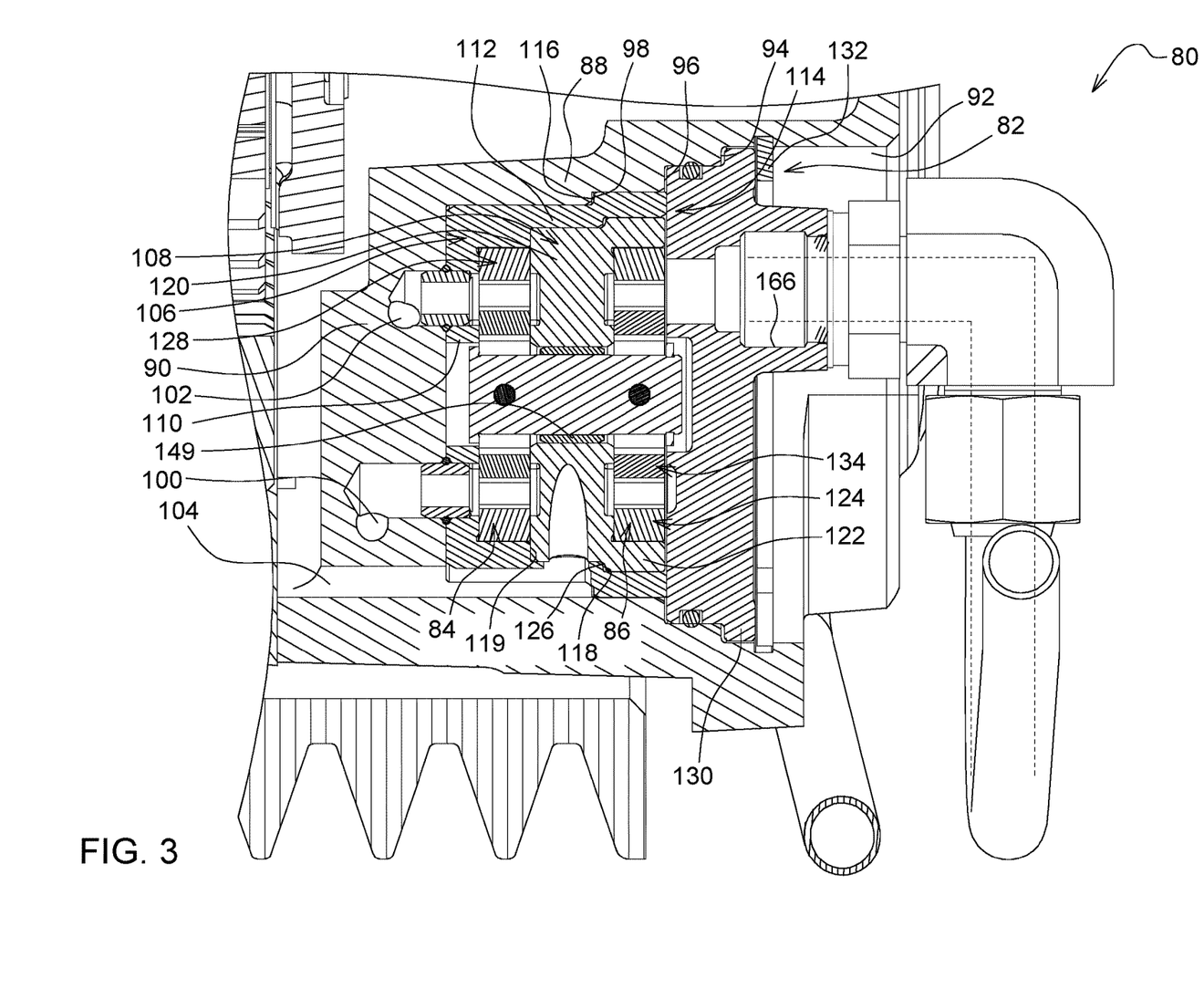
FIG. 3 shows an enlarged, cross-sectional view of the gerotor pump arrangement of FIG. 2.

As FIG. 1 to 3 show, a gerotor pump arrangement 80 can be mounted on the first housing part 12, and is described in further detail with reference to FIG. 3 to 7. The gerotor pump arrangement 80 may be mounted in a pot-like cylindrical recess 82 which can be formed on the first housing part 12. The gerotor pump arrangement 80 can include a first gerotor set 84 which forms a hydraulically drivable drive side of the gerotor pump arrangement 80, and a second gerotor set 86 which forms a pump side, driven by the first gerotor set 84, of the gerotor pump arrangement 80. The recess 82 can resemble a hollow cylinder with a cylinder wall 88, a cylinder base 90 (or end wall) and a cylinder opening 92 (or end opening). A first, a second and a third cylindrical shoulder 94, 96, 98 can be formed on the cavity side of the cylinder wall 88, at each of which the inner diameter of the recess 82 reduces. A hydraulic inflow line 100 and a hydraulic outflow line 102 can be formed in the cylinder base 90. Furthermore, adjacent to the cylinder wall 88, a connecting bore 104 can be formed in the cylinder base 90 which connects the cavity of the hollow cylinder to the interior of the transmission 10. The gerotor pump arrangement 80 furthermore may include a first housing part 106 and a second housing part 108. The housing parts 106 and 108 can each be hollow and cylindrical.

The first housing part 106 can have an end housing wall 110, a circumferential housing wall 112 and a housing opening 114 opposite the end housing wall 110. The circumferential housing wall 112 can be provided on the outside with a cylindrical shoulder 116, and on the inside with a first cylindrical shoulder 118 and a second cylindrical shoulder 119, wherein the shoulder 116 on the outside is complementary in form to the third shoulder 98 formed on the cavity side of the cylinder wall 88.

The second housing part 108 can have an end housing wall 120, a circumferential housing wall 122 and a housing opening 124 opposite the end housing wall 120. The circumferential housing wall 122 can be provided on the outside with a cylindrical shoulder 126, wherein this is complementary in form to the shoulder 118 formed on the inside of the circumferential housing wall 112 of the first housing part 106.

The first and second housing parts 106 and 108 together may form a housing for the gerotor pump arrangement 80, wherein the first and the second housing parts are arranged telescopically inside one another, in that the second housing part 108 fits into the first housing part 106 and is surrounded by the latter. By the telescopic movement of the housing parts 106, 108 (or the fitting of the second housing part 108 in the first housing part 106), the end housing wall 120 of the second housing part 108 may come to rest on the second cylindrical shoulder 119 of the inside of the circumferential housing wall 112 of the first housing part 106, so that a first cavity 128 is formed between the end housing wall 110 of the first housing part 106 and the end housing wall 120 of the second housing part 108. Such a design of the housing parts 106 and 108, in particular the telescopic arrangement, can allow a particularly compact and space-saving construction.

The respective housing openings 114 and 124 of the telescopically arranged housing parts 106 and 108 may be oriented in the same direction and covered by a common housing cover 130, wherein the housing cover 130 may be held on the side of the cylinder opening 92 of the recess 82 on the cylinder wall 88 by a locking ring 132 and by face edges of the circumferential housing walls 112 and 122 of the first and second housing parts 106 and 108, and thus close the respective housing openings 114 and 124. A second cavity 134 can thereby be formed between the housing cover 130 and the end housing wall 120 of the first housing part 106.

The cavities 128 and 134 may be cylindrical and defined circumferentially by the circumferential housing walls 112, 122 of the first and second housing parts 106, 108. The first cylindrical cavity 128 may be furthermore defined at the ends on the one side by the end housing wall 110 of the first housing part 106, and on the opposite side by the end housing wall 120 of the second housing part 108. The second cylindrical cavity 134 can furthermore be defined at the ends by the end housing wall 120 of the second housing part 108 and the housing cover 130 covering the housing opening 124 of the second housing part 108. The housing cover 130 may, as stated above, be dimensioned such that it protrudes beyond the housing opening 124 of the second housing part 108 and also covers the housing opening 114 of the first housing part 106. Thus, both housing parts 106, 108 may be covered or closed by the same housing cover 130.

The first gerotor set 84 may be arranged in the first cavity 128, and the second gerotor set 86 in the second cavity 134. Each gerotor set 84, 86 can include an inner rotor 136, 138 and an outer rotor 140, 142, wherein the respective inner rotor 136, 138 is configured as a gear wheel with an external toothing and the respective outer rotor 140, 142 as a gear wheel, in particular a ring gear, with an internal toothing. The inner rotors 136, 138 can each have six teeth 144 and the outer rotors can each have seven teeth 146. The inner rotors 136, 138 can be rotationally fixedly mounted on a common shaft 148 and rotate about a common rotational axis 150. The shaft 148 can extend through the end housing wall 120 of the second housing part 108, and be mounted in the end housing wall 120 of the second housing part 108 by means of a plain bearing bushing 149. This can create a rotationally fixed connection between the inner rotor 136 of the first gerotor set 84 and the inner rotor 138 of the second gerotor set 86, so that a rotation of the first inner rotor 136 causes a rotation of the second inner rotor 138 in the same direction.

Figure 4:
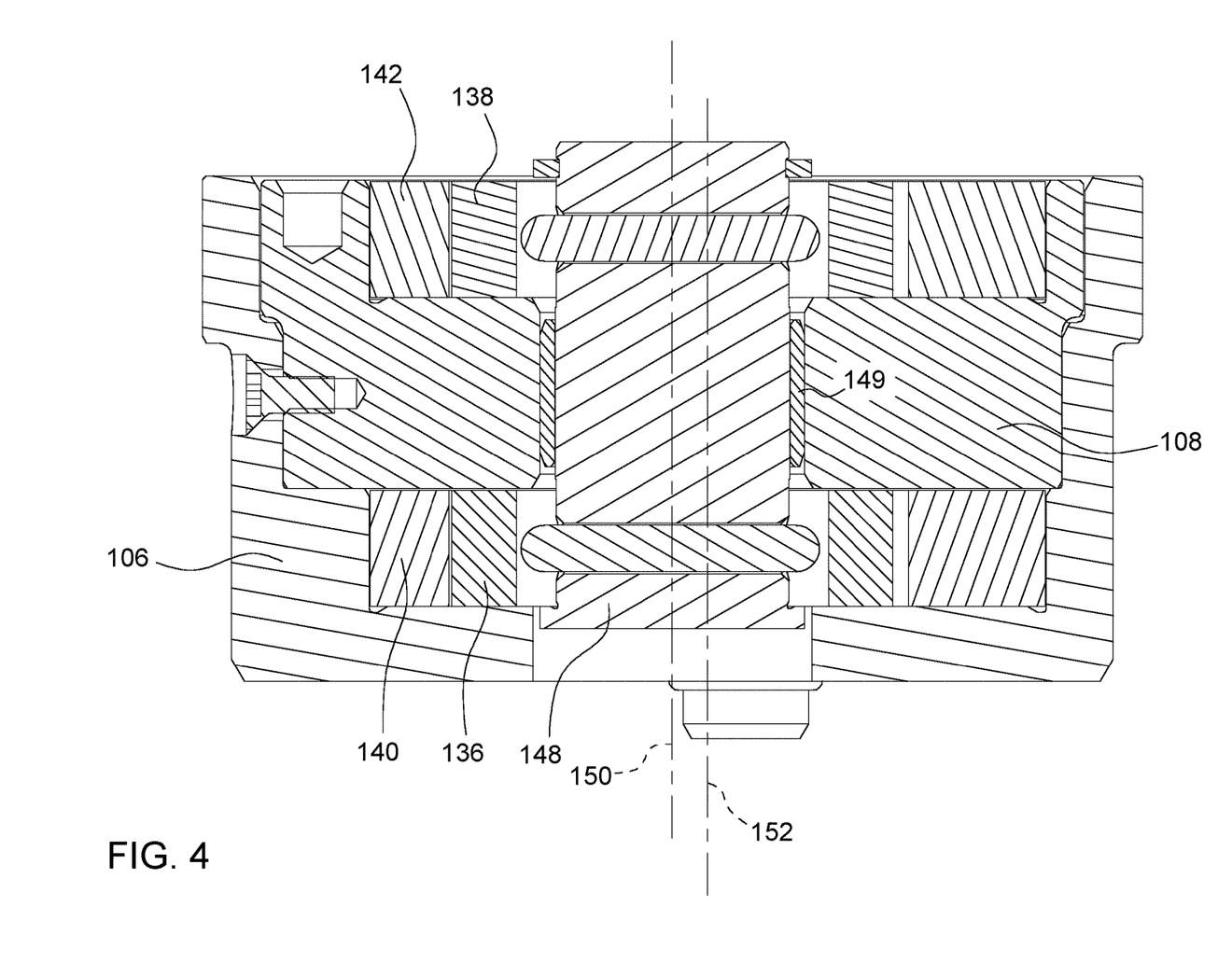
FIG. 4 shows an enlarged, partially cross-sectional view of the gerotor pump arrangement of FIG. 2 in a further cross-sectional plane.
Figure 5:
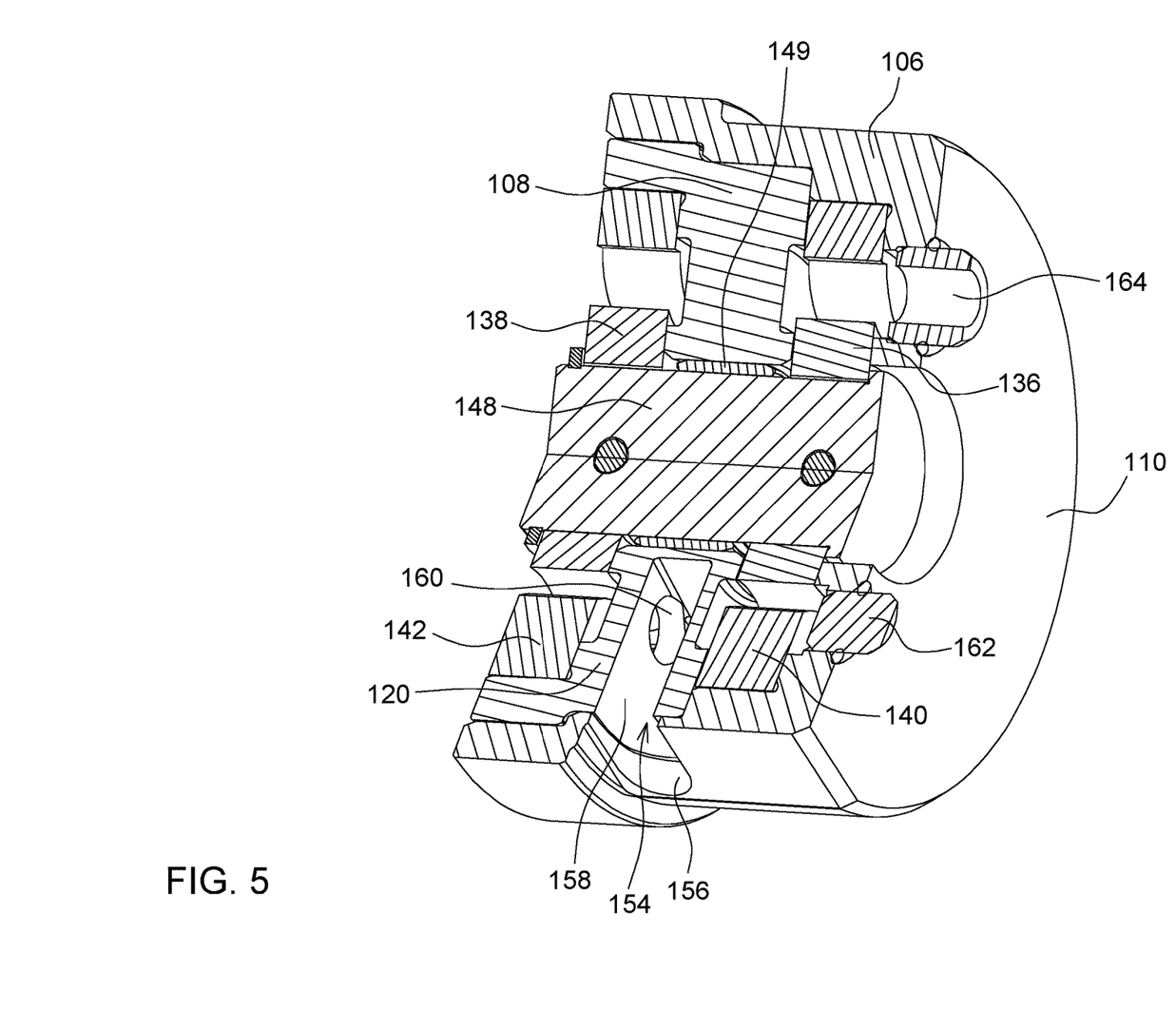
FIG. 5 shows a perspective, partially cross-sectional view of the gerotor pump arrangement of FIG. 2 in a further cross-sectional plane.
Figure 6:
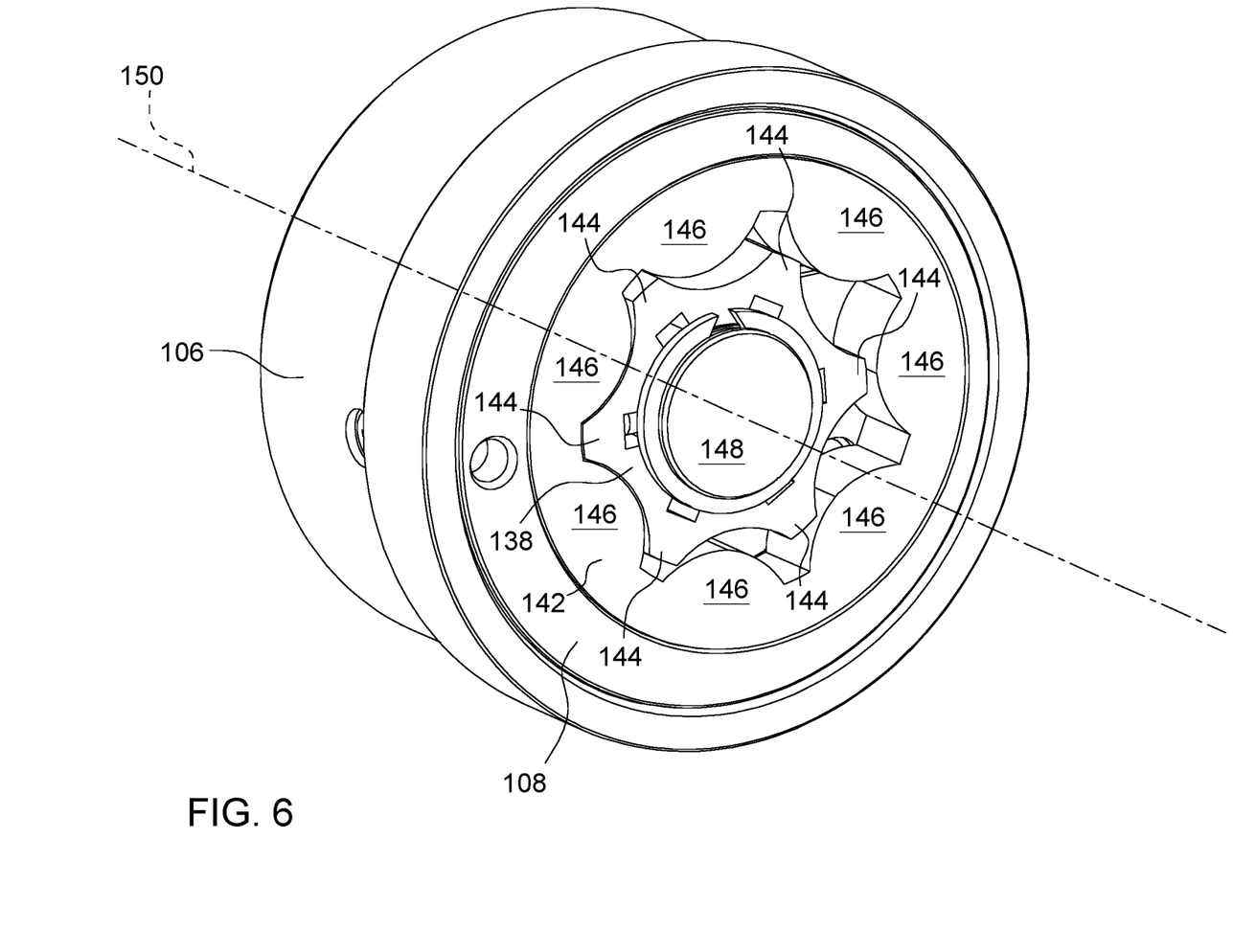
FIG. 6 shows a perspective, partial view of the gerotor pump arrangement of FIG. 2.
Figure 7:
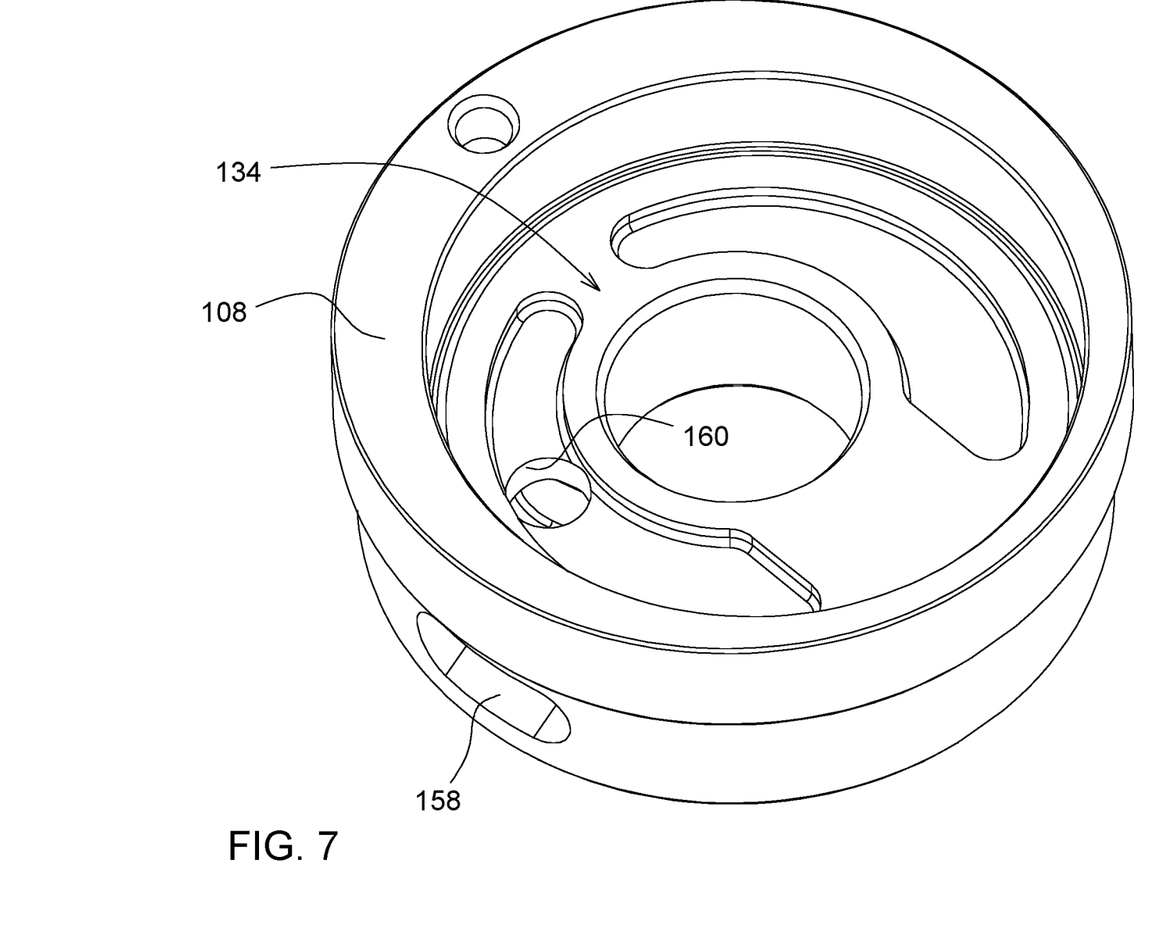
FIG. 7 shows a perspective view of a housing part of the gerotor pump arrangement of FIG. 2.

As evident in particular from FIGS. 4, 6 and 7, the cavities 128, 134 can be formed eccentrically to the rotational axis 150 of the shaft 148, so that the outer rotors 140, 142 of the gerotor sets 84, 86 rotate about their own common rotational axis 152 which is arranged parallel and offset to the rotational axis 150 of the shaft 148 by an eccentricity (E) (see FIG. 4). The eccentricity (E) can be dimensioned such that the teeth 144 of the respective inner rotor 136, 138 engage on one rotation side in the tooth gaps between the teeth 146 of the respective outer rotor 140 and 142, and on the opposite rotation side the teeth 144 of the inner rotors 136, 138 each pass the teeth 146 of the outer rotors 140, 142, so that a rotation of the inner rotors 136, 138 about their rotational axis 150 causes a rotation of the outer rotors 140, 142 about their rotational axis 152.

Starting from the outside of the first housing part 106, in the region of the opening of the connecting bore 104 formed in the cylinder base 90 adjacent to the cylinder wall 88, a supply passage 154 can be formed which leads through an opening 156 in the circumferential housing wall 112 of the first housing part 106, along a channel 158 and a bore 160 in the end housing wall 120 of the second housing part 108, into the second cylindrical cavity 134. Thus, the supply passage 154 can create a through-flow channel which leads from the outside of the first housing part 106 into the second cavity 134, and in particular into a rolling region of the second gerotor set 84. A rolling region of the gerotor sets 84, 86 is the region in which the teeth 144 and 146 come into engagement with one another. Thus, via the connecting bore 104 and the supply passage 154, a liquid medium, for example hydraulic fluid, cooling fluid or lubricating oil, can pass, in particular can be drawn, from a region outside the first housing part 106, in particular from the interior of the transmission 10, into the rolling region of the second gerotor set 86.

A supply passage 162 and an outlet passage 164 can be formed in the end housing wall 110 of the first housing part 106, and lead into the first cylindrical cavity 128 or into a rolling region of the first gerotor set 86, and can be connected to the hydraulic inflow line 100 or the hydraulic outflow line 102 of a hydraulic arrangement (not shown) for driving the gerotor pump arrangement 80. Via the supply passage 162, hydraulic fluid can be conveyed under high pressure into the rolling region, whereby the inner rotor 136 and the outer rotor 140 of the first gerotor set 84 are set in rotation. The hydraulic fluid may be discharged from the rolling region via the outlet passage 164.

A further outlet passage 166 can be formed in the housing cover 130 and be connected to the outflow line 24 of a hydraulic lubricant and coolant circuit (not shown in detail) for the transmission. The outlet passage 166 can connect the rolling region of the second gerotor set 86 in the second cylindrical cavity 134 to the outflow line 166, so that liquid medium drawn into the rolling region of the second gerotor set can be discharged via the outlet passage 166. Because of the above-described hydraulically generated rotation of the first gerotor set 84, and the rotationally fixed connection of the two inner rotors 136 and 138, the second gerotor set 86 can also be set in rotation, whereby hydraulic fluid can be drawn from the transmission 10 via the connecting bore 104 and supply passage 154 into the rolling region of the second gerotor set 86, and supplied via the outlet passage 166 to the lubricating and/or cooling circuit for the transmission.

The hydraulically operated gerotor pump arrangement 80 may allow uninterrupted hydraulic supply to be ensured independently of the gear of the transmission 10, i.e. independently of whether the transmission 10 is driven in the first gear position via the belt drive drum 34 or in a second gear position in reversing mode via the worm drive.

The gerotor pump arrangement 80 of the above-described type may thus be used in connection with the transmission 10 to provide a hydraulic fluid circulation independently of the gear of the transmission. The transmission 10 may for this be connected to a hydraulic device (not shown) which provides hydraulic fluid for lubrication and/or cooling. Via said gerotor pump arrangement 80, hydraulic fluid may be extracted from the interior of the transmission 10 and supplied to a hydraulic tank and/or a cooling system (not shown), from where the hydraulic fluid is supplied back to the transmission housing 10. The first gerotor set 84 may be hydraulically driven, wherein hydraulic fluid may be conveyed through the supply passage 162 on the first gerotor set 84 under high pressure into the rolling region of the first gerotor set, and the inner and outer rotors of the first gerotor set 84 are brought into rotation. The driving hydraulic fluid may be discharged at low pressure via the outlet passage 164 of the first gerotor set. The rotation of the inner rotor of the first gerotor set 84 can also set the inner and outer rotors of the second gerotor set 86 in rotation, whereby a suction effect can be generated in the rolling region of the second gerotor set 86 and hydraulic fluid may be drawn from the interior of the transmission 10 via the supply passage 154 to the second gerotor set 86 into the rolling region of the second gerotor set 86, and can be discharged via the outlet passage 166 of the second gerotor set 86 to the cooling system.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A gerotor pump arrangement for extracting hydraulic fluid from a transmission housing of a transmission, comprising:
   a first gerotor set and a second gerotor set, wherein the first gerotor set comprises a first inner rotor and a first outer rotor, and the second gerotor set comprises a second inner rotor and a second outer rotor, wherein the first gerotor set forms a hydraulically drivable drive side of the gerotor pump arrangement, and the second gerotor set forms a pump side, driven by the first gerotor set, of the gerotor pump arrangement, wherein the first and second inner rotors are rotationally fixedly mounted on a common shaft which is rotatable about a rotational axis, wherein the first gerotor set is disposed in a first cylindrical cavity formed within a first hollow cylindrical housing part, and the second gerotor set is disposed in a second cylindrical cavity formed within a second hollow cylindrical housing part; and a supply passage which leads from an outside of a circumferential housing wall of the first hollow cylindrical housing part and through an end housing wall of the second hollow cylindrical housing part into the second cylindrical cavity.

2. The gerotor pump arrangement as claimed in claim 1, wherein the first hollow cylindrical housing part further comprises an end housing wall and the first hollow cylindrical housing part has a housing opening opposite the end housing wall of the first hollow cylindrical housing part, and wherein the second hollow cylindrical housing part further comprises an end housing wall, and a housing opening of the second hollow cylindrical housing part opposite the end housing wall of the second hollow cylindrical housing part, the gerotor pump arrangement further comprising:
a housing cover covering the respective end housing walls of both the first hollow cylindrical housing part and the second hollow cylindrical housing part.

3. The gerotor pump arrangement of claim 2, wherein the first cylindrical cavity is defined radially inwards of the circumferential housing wall of the first hollow cylindrical housing part and at axial ends by an end housing wall of the first hollow cylindrical housing part and the end housing wall of the second hollow cylindrical housing part, and wherein the second cylindrical cavity is defined radially inwards of the circumferential housing wall of the second hollow cylindrical housing part and at axial ends by the end housing wall of the second hollow cylindrical housing part and the housing cover covering the housing openings.

4. The gerotor pump arrangement of claim 2, wherein the first gerotor set is mounted in the first cylindrical cavity, and the second gerotor set is mounted in the second cylindrical cavity, and the shaft extends through the end housing wall of the second hollow cylindrical housing part and is mounted therein.

5. The gerotor pump arrangement of claim 2, and further comprising a supply passage and an outlet passage formed in the end housing wall of the first hollow cylindrical housing part and leading into the first cylindrical cavity.

6. The gerotor pump arrangement of claim 5, and further comprising an outlet passage formed in the housing cover and which leads into the second cylindrical cavity.

7. The gerotor pump arrangement of claim 6, wherein the first and second cylindrical cavities are coaxial to one another and eccentric to the rotational axis of the shaft, and the outer rotors rotate eccentrically to the inner rotors and the shaft on their own common rotational axis.

8. The gerotor pump arrangement of claim 1, wherein the supply passage passes through the circumferential housing wall of the first housing part.

9. The gerotor pump arrangement of claim 1, wherein the second hollow cylindrical housing part is telescopically nested radially inwards of the circumferential housing wall of the first hollow cylindrical housing part, wherein the first and second hollow cylindrical housing parts each comprise a housing opening defining an open end of the respective cylindrical cavity in an axial direction of the rotational axis.

10. The gerotor pump arrangement of claim 9, wherein the second hollow cylindrical housing part is nested in its entirety within the first hollow cylindrical housing part.

11. The gerotor pump arrangement of claim 1, wherein the first gerotor set is disposed on one side of the end housing wall of the second cylindrical housing part in the direction of the rotational axis, and the second gerotor set is disposed on an opposite side of the end housing wall of the second cylindrical housing part in the direction of the rotational axis.

12. A gerotor pump arrangement for extracting hydraulic fluid from a transmission housing of a transmission, comprising:

a first gerotor set and a second gerotor set, wherein the first gerotor set comprises a first inner rotor and a first outer rotor, and the second gerotor set comprises a second inner rotor and a second outer rotor, wherein the first gerotor set forms a hydraulically drivable drive side of the gerotor pump arrangement and the second gerotor set forms a pump side, driven by the first gerotor set of the gerotor pump arrangement, wherein the first and second inner rotors are rotationally fixedly mounted on a common shaft which is rotatable about a rotational axis, wherein the first gerotor set is disposed in a first cylindrical cavity formed within a first hollow cylindrical housing part, and the second gerotor set is disposed in a second cylindrical cavity formed within a second hollow cylindrical housing part, wherein the second hollow cylindrical housing part fits into the first hollow cylindrical housing part, wherein the first and second hollow cylindrical housing parts each comprise a housing opening defining an open end of the respective cylindrical cavity in an axial direction of the rotational axis.

13. The gerotor pump arrangement of claim 12, and further comprising a supply passage which leads from an outside of a circumferential housing wall of the first hollow cylindrical housing part through an end housing wall of the second hollow cylindrical housing part into the second cylindrical cavity.

14. The gerotor pump arrangement of claim 13, and further comprising a supply passage and an outlet passage formed in an end housing wall of the first hollow cylindrical housing part and leading into the first cylindrical cavity.

15. The gerotor pump arrangement of claim 11, and further comprising a housing cover closing both of the housing openings, and an outlet passage formed in the housing cover and which leads into the second cylindrical cavity.

16. The gerotor pump arrangement of claim 15, wherein the first and second cylindrical cavities are coaxial to one another and eccentric to the rotational axis of the shaft, and the outer rotors rotate eccentrically to the inner rotors and the shaft on their own common rotational axis.

17. The gerotor pump arrangement of claim 12, wherein the first gerotor set is disposed on one side of an end housing wall of the second cylindrical housing part in the direction of the rotational axis, and the second gerotor set is disposed on an opposite side of the end housing wall of the second cylindrical housing part in the direction of the rotational axis.

18. A transmission comprising:
a transmission housing;
a gerotor pump arrangement for extracting hydraulic fluid from the transmission housing, comprising:
a first gerotor set and a second gerotor set, wherein the first gerotor set comprises a first inner rotor and a first outer rotor, and the second gerotor set comprises a second inner rotor and a second outer rotor, wherein the first gerotor set forms a hydraulically drivable drive side of the gerotor pump arrangement, and the second gerotor set forms a pump side, driven by the first gerotor set, of the gerotor pump arrangement, wherein the first and second inner rotors are rotationally fixedly mounted on a common shaft which is rotatable about a rotational axis, wherein the first gerotor set is disposed in a first cylindrical cavity formed within a first hollow cylindrical housing part, and the second gerotor set is disposed in a second cylindrical cavity formed within a second hollow cylindrical housing part; and a supply passage which leads from an outside of a circumferential housing wall of the first hollow cylindrical housing part and through an end housing wall of the second hollow cylindrical housing part into the second cylindrical cavity.

19. The transmission as claimed in claim 18,
wherein the first hollow cylindrical housing part further comprises an end housing wall, and the first hollow cylindrical housing part has a housing opening opposite the end housing wall of the first hollow cylindrical housing part, wherein the second hollow cylindrical housing part further comprises an end housing wall, and a housing opening of the second hollow cylindrical housing part opposite the end housing wall of the second hollow cylindrical housing part, the transmission further comprising:
a housing cover covering the respective end housing walls of both the first hollow cylindrical housing part and the second hollow cylindrical housing part.

20. The gerotor pump arrangement of claim 18, wherein the second hollow cylindrical housing part is telescopically nested radially inwards of the circumferential housing wall of the first hollow cylindrical housing part, wherein the first and second hollow cylindrical housing parts each comprise a housing opening defining an open end of the respective cylindrical cavity in an axial direction of the rotational axis.

* * * * *